United States Patent [19]

Ida et al.

[11] 4,354,306

[45] Oct. 19, 1982

[54] MACHINE TOOL HAVING REPLACEABLE GANG HEADS

[75] Inventors: Jinsei Ida, Sayama; Kenzaburo Matsuo; Hiroshi Ejiri, both of Kawagoe; Takeshi Ishibashi, Sayama, all of Japan

[73] Assignee: Honda Giken Kogyo Kabushiki Kaisha, Tokyo, Japan

[21] Appl. No.: 95,556

[22] Filed: Nov. 19, 1979

[30] Foreign Application Priority Data

Nov. 28, 1978 [JP] Japan .................................. 53/146093

[51] Int. Cl.³ .......................................... B23Q 3/157
[52] U.S. Cl. ...................................................... 29/568
[58] Field of Search .................. 29/568, 26 A; 408/35

[56] References Cited

U.S. PATENT DOCUMENTS

| | | | |
|---|---|---|---|
| 3,286,595 | 11/1966 | Wollenhaupt | 29/568 X |
| 3,354,761 | 11/1967 | Sadier | 29/568 X |
| 3,509,619 | 5/1970 | Lipp | 408/35 |
| 3,546,774 | 12/1970 | Stöferle et al. | 29/568 |
| 3,762,036 | 10/1973 | Goeber | 408/35 X |
| 3,925,878 | 12/1975 | Kikuchi | 29/568 |
| 4,216,572 | 8/1980 | Matsushita | 29/568 |

*Primary Examiner*—William R. Briggs
*Attorney, Agent, or Firm*—Armstrong, Nikaido, Marmelstein & Kubovcik

[57] ABSTRACT

A replaceable gang head machine tool comprising a working unit having a driving motor mounted on a slide table adapted to be driven forwardly and rearwardly and an annular rail disposed on the machine base and carrying a plurality of gang heads adapted for being driven by an index table to selectively place a gang head in an operative position. A stockyard extends longitudinally adjacent the machine base and has a longitudinally extending runway guidably supporting a carrying truck for movement therealong and a plurality of replacement gang heads are disposed on the stockyard along the length thereof so that the replacement gang heads can replace the heads disposed on the annular rail by the carrying truck.

2 Claims, 3 Drawing Figures

MACHINE TOOL HAVING REPLACEABLE GANG HEADS

FIELD OF THE INVENTION

This invention relates to a machine tool in which a plurality of gang heads of different type are provided and any one head is freely selectable for use.

PRIOR ART

The inventors have previously proposed a machine tool of this type comprising a machine base, a working unit having a driving motor and mounted on a slide table arranged to be driven to move forwardly and rearwardly on the machine base, an annular rail comprising a rear stationary rail and a front movable rail disposed on the machine base, and a plurality of gang heads disposed around the annular rail so as to be detachably supported thereon, said gang heads being arranged to be turned by an index table so that any one thereof may be selected on the movable rail. Thus, in the course of the subsequent advance movement of the working unit, the selected head can be combined therewith and be advanced together with the movable rail. See U.S. Patent Application Ser. No. 967,307 filed Dec. 7, 1978. In this case, any desired one of the plural gang heads as desired can be removed therefrom and be replaced with any of further gang heads previously prepared, as occasion demands.

SUMMARY OF THE INVENTION

An object of this invention is to provide a machine tool of the above type in which there is provided on a lateral side thereof a longitudinally extending storage means having a longitudinally extending runway for guiding a carrying truck, and a plurality of replacement gang heads are disposed in the storage means thereby such that said replacement gang heads may replace, by the carrying truck, the plurality of gang heads disposed around the annular rail.

DETAILED DESCRIPTION

Figure 1:
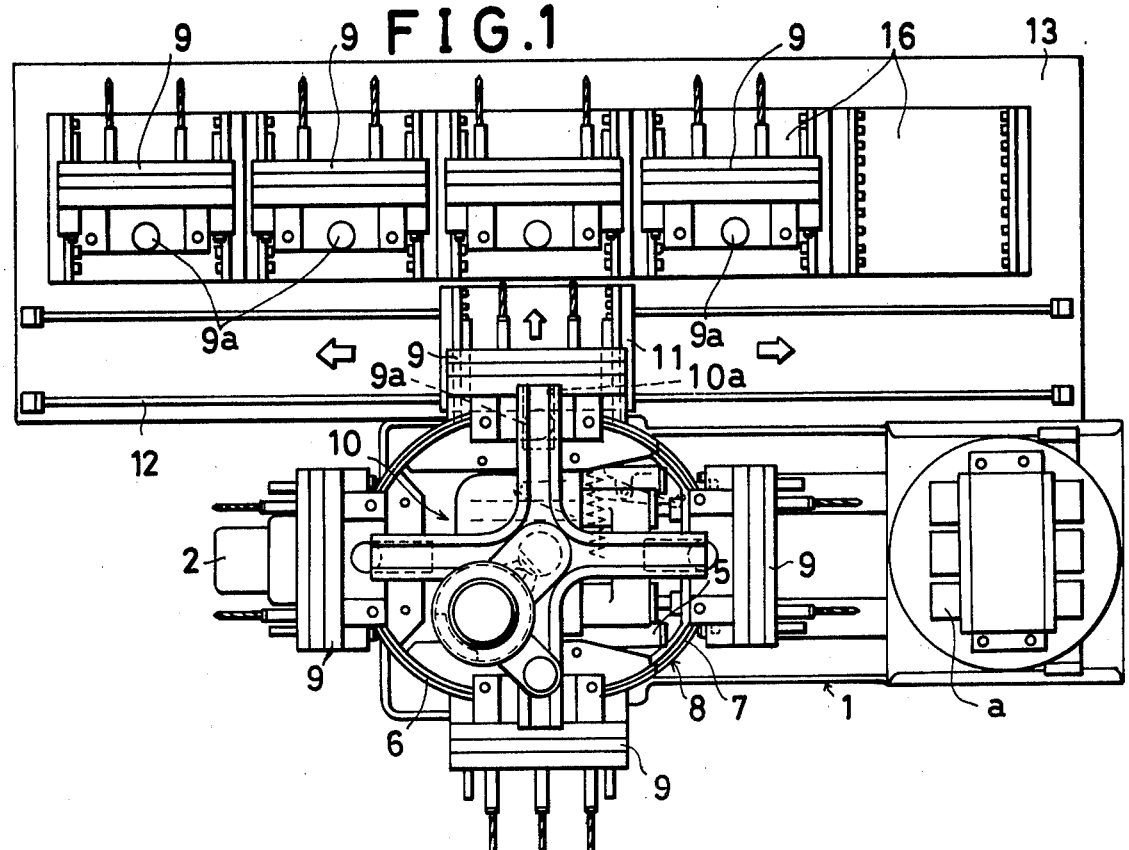
FIG. 1 is a top plan view of one embodiment according to this invention.
Figure 2:
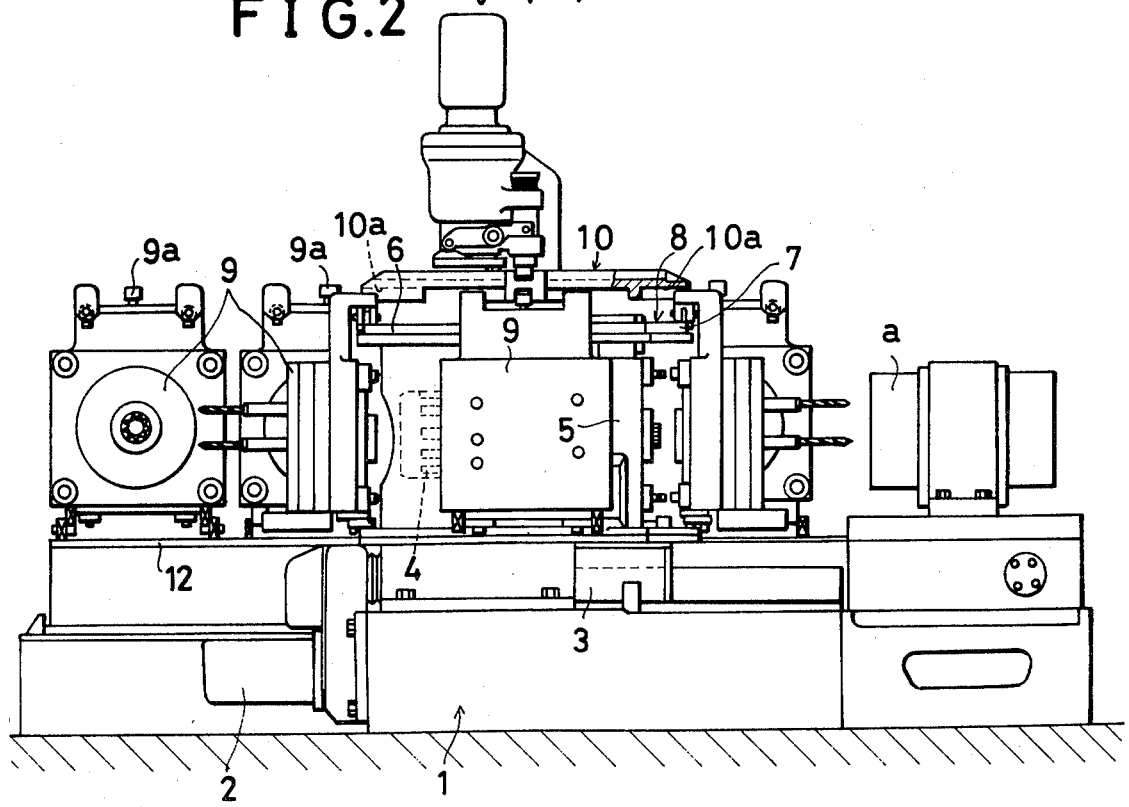
FIG. 2 is a side elevational view thereof.
Figure 3:
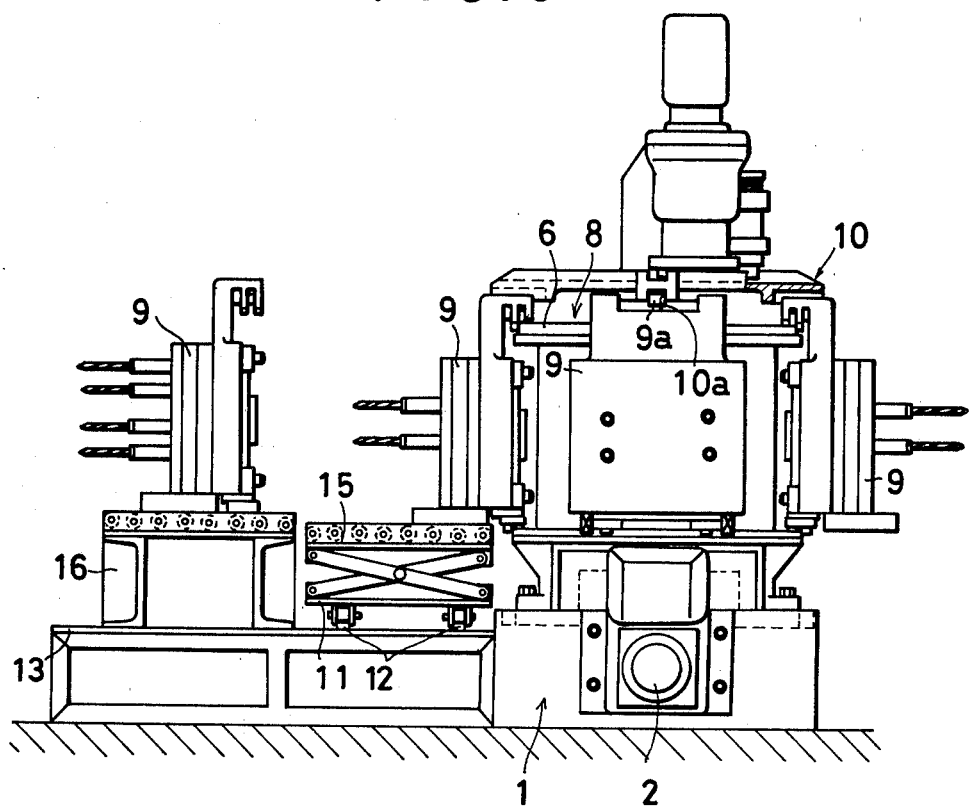
FIG. 3 is a rear elevational view thereof.

Referring to the drawings, therein is seen a machine tool construction comprising a machine base on which a slide table 3 is supported for being moved forwards and rearwards by a feed means 2, such as a motor or the like. Mounted on the slide table 3 is a working unit 5 having a driving motor 4. An annular rail 8 comprising a rear stationary rail 6 and a front movable rail 7 is provided on the rear side of the machine base 1. A plurality of gang heads 9 are disposed around the annular rail 8 and are detachably supported thereon. A plurality of gang heads 9 may be turned along the annular rail 8 by operation of an index table 10 mounted above the rail and any desired gang head can be selected on the movable rail 7 for movement to an operating station. Thus, if the working unit 5 is then advanced, the selected gang head is connected thereto for travel therewith together with the movable rail 7, and thereby a predetermined operation can be carried out on a workpiece a provided in front of the gang head. Each arm of the index table 10 is provided in its bottom surface at its forward end with a pin groove 10a which receives a pin 9a on the top surface of each gang head 9.

The construction up to this point is similar to that in Patent application Ser. No. 967,307.

According to this invention, the arrangement is such that any desired one of the plurality of gang heads 9 can be removed and be replaced with any one of an additional plurality of gang heads are previously prepared.

Namely, the machine base 1 is provided at one lateral outside surface thereof with a longitudinally extending runway 12 guidably supporting a truck 11 for movement therealong. Adjacent the runway is a longitudinally extending storage means or stockyard 13, and a plurality of gang heads 9 are disposed on the stockyard 13 therealong. The truck 11 has on its top surface, a carrier seat 15 supported by an extendable and retractable linkage by which the carrier seat is movable upwards and downwards by turning a handle (not illustrated) so that by the upward movement of the carrier seat 15, the gang head 9 on the annular rail 8 is lifted by the seat 15 so as to be detached from the rail and then, by pushing the head 9 manually outwards, the pin 9a on its upper surface may exit from the pin groove 10a. Furthermore, the stockyard 13 is provided with a plurality of supporting bases 16 disposed along the stockyard so that respective gang heads 9 may be placed thereon, at least one of the supporting bases 16 being left unoccupied. The top surface of the carrier seat 15 and those of the supporting bases 16 are respectively provided with a series of rollers or the like so that the movement of the gang head 9 by pushing may be facilitated.

The operation of the apparatus will now be explained as follows.

If the truck 11 is moved to be positioned just below a gang head 9 positioned on the lateral side of the periphery of the annular rail 8, as illustrated, and then the carrier seat 15 is raised, the head 9 is moved upwards and detached from the rail 8 and at the same time rests on the base seat 15. Then, in this condition, the head 9 is pushed or pulled outwards as shown by the arrow and thereby the pin 9a of the head is separated from the pin groove 10a. Then, the truck 11 is moved to the right in FIG. 1 as shown by the arrow to a position where it faces the unoccupied supporting base 16 and then the head 9 on the carrier seat 15 is pushed to move onto the supporting base 16.

Thereafter, the truck 11 is moved to the left in FIG. 1 as shown by the arrow to a position where it faces any desired one of the other supporting bases 16, and at that position the gang head 9 on that supporting base 16 is pushed to move onto the carrier seat 15 of the upper surface of the truck 11. Thereafter, the truck 11 is returned to the original position and the gang head 9 is pushed and then the carrier seat 15 is moved downwards, whereby the gang head 9 is deposited onto and attached to the rail 8 on the upper surface thereof. Thus, the operation is completed for replacement of one of the heads 9. If, next, the index table 10 is operated so as to bring another gang head 9 to the foregoing lateral side position, the head 9 can be replaced in almost the same manner as described above. If, this is repeated one after another, all the gang heads can be replaced.

Thus, according to this invention, not only can the plurality of gang heads disposed around the annular rail be selectively operated but they can be replaced selectively with additional heads previously stored in the stockyard so that the total number of gang heads can be substantially increased, and accordingly the machine tool can be improved in its versatility.

What is claimed is:

1. In a gang head machine tool of the type including a base, a slide table mounted on said base for sliding movement longitudinally thereof, a working unit having a driving motor mounted on said slide table, a magazine integral with said working unit storing plural independent gang heads, said magazine including vertically spaced rails encircling said working unit and along which said independent gang heads are moveable, an indexing mechanism for moving said gang heads along said rails to locate a selected gang head in an operative position relative to said working unit, and means for detachably interconnecting said working unit and said selected gang head in operative working relationship;

the improvement comprising the combination with said gang head machine tool of a second magazine independent of and supplemental to said first magazine, said second magazine being positioned adjacent said working unit and including a storage device for gang heads additional to those stored in said first magazine, a runway interposed between said working unit and said second magazine, and a transfer device moveable longitudinally of said runway and operative to remove a selected gang head from said first magazine and transfer said selected gang head to said second magazine, and operative to transfer any selected one of said gang heads from said second magazine to said first magazine in substitution for said selected gang head removed from said first magazine, said transfer device including means for uncoupling said selected gang head from said first magazine and coupling a gang head selected from said second magazine to said first magazine without disturbing the positioning of the remainder of said gang heads stored in said first magazine and without disturbing the positioning of the working gang head coupled to said machine, said means comprising a wheeled truck moveable longitudinally of rails comprising said runway, a vertically moveable upper support surface of said truck for the reception of a gang head thereon, means for raising and lowering said upper support surface, and roller means incorporated into said upper support surface facilitating the movement of a gang head laterally onto said upper support surface facilitating the movement of a gang head laterally onto said upper support surface and the removal of the gang head laterally of said upper support surface in a direction transverse to the longitudinal axis and direction of movement of said truck.

2. The combination of claim 1, in which said second magazine includes plural supporting bases arranged serially of the length thereof, at least one of said supporting bases being unoccupied by a gang head, said bases each including roller means facilitating movement of a gang head between said upper support surface and said unoccupied supporting base and facilitating movement of a gang head between a supporting base and said upper support surface of said truck.

* * * * *